June 12, 1951 G. SLATER 2,557,015

METHOD AND MACHINE FOR PLAYING DISK TYPE PHONOGRAPH RECORDS

Filed Feb. 11, 1948

INVENTOR.
Gilbert Slater
by Popp and Popp
Attorneys.

Patented June 12, 1951 2,557,015

UNITED STATES PATENT OFFICE 2,557,015

METHOD AND MACHINE FOR PLAYING DISK TYPE PHONOGRAPH RECORDS

Gilbert Slater, Frecheville, near Sheffield, England, assignor to Maurice Horowitch and Clarence H. Ackley, both of Binghamton, and Harold Horowitz, Buffalo, N. Y.

Application February 11, 1948, Serial No. 7,646
In Great Britain May 24, 1940

Section 1, Public Law 690, August 8, 1946
Patent expires May 24, 1960

5 Claims. (Cl. 274—10)

Figures 1, 2:
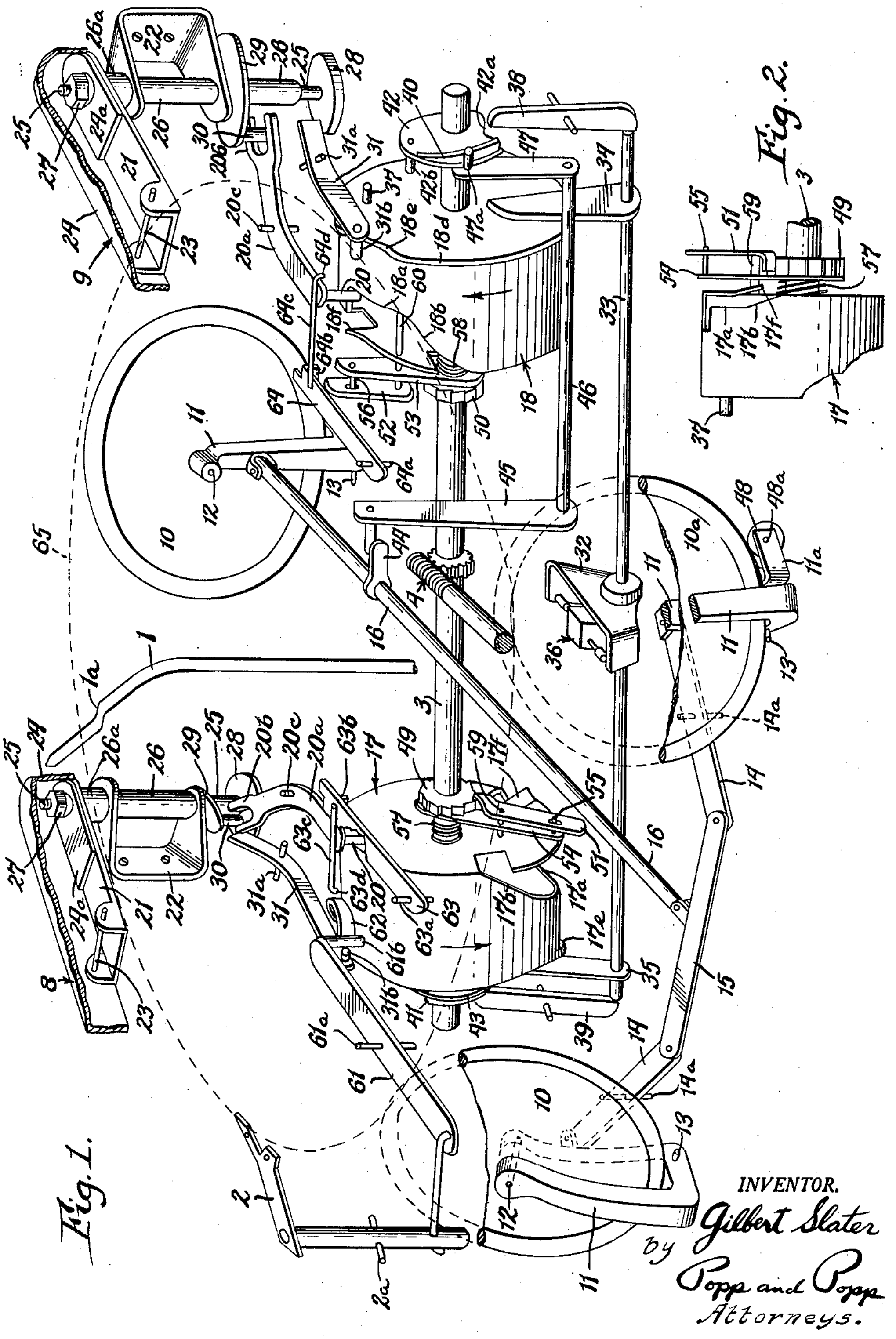

This invention relates to a method and machine for playing disk type phonograph records and more particularly to a method and machine which automatically plays a succession of such records on both faces thereof and in which there is no turntable in the accepted sense of the word and no record inverting mechanism.

One of the principal objects of the invention is to provide such apparatus which does not require an increase in the size of the cabinet, as compared with a drop record player playing a succession of records from one side only, and in which the apparatus forming the subject of the invention does not interfere with the free loading, unloading or other operations.

Another important object of the invention is to provide such an apparatus which is extremely simple and rugged in construction and which will stand up under conditions of severe and constant use without getting out of order or requiring repairs.

Another object of the invention is to provide such a method and machine which is gentle in its action and operates with the minimum wear upon the records as well as with the minimum likelihood of breaking or otherwise injuring the record.

Another object of the invention is to provide such apparatus which is extremely low in cost.

Another object of the invention is to provide such a record changer which will operate to reproduce the transcription on the record played with a high degree of fidelity.

Other objects and advantages of the invention will appear from the following description and drawings in which Fig. 1 is a perspective view showing the parts essential to an understanding of the invention in schematic form, the framework of the machine and most of the bearings supporting the various elements for their operative movements having been omitted for the sake of clarity.

Fig. 2 is a slightly enlarged fragmentary side elevational view of a part of the clutch mechanism shown in Fig. 1.

While the invention can be incorporated in record changers varying widely in construction and operation, the record changer is shown in the drawings as including a vertical, stationary center post 1 having its upper end arranged at an angle to the vertical and having the extreme upper extremity of this upper end offset to provide an abrupt shoulder 1*a*, this shoulder 1*a* supporting a plurality of records upon the upper extremity of the center post. The lowermost record of the stack so supported is released from the shoulder 1*a* by means of a mechanical finger or pusher 2 which is moved to exert lateral pressure upon the lowermost record when it is desired to remove this lowermost record from the stack or magazine supported on the center post.

The main operating elements of the record changer are actuated by a cam drive shaft 3 driven through gearing 4 by a drive shaft 5 in turn driven by a reversible electric motor or other source of power (not shown).

The record player is shown as including two tone arms 8, 9, which are shown as broken away to disclose their mounting, the tone arm 8 playing the under side of a record 65, as shown by dotted lines, and the tone arm 9 playing the top side of this record. This record 65 is shown as supported and rotated by three supporting rubber tired wheels 10, 10*a*, two of the wheels, designated at 10, being idlers, and the third wheel 10*a* being shown as a driving wheel. Each of these three wheels 10, 10*a* is shown as supported in substantially U-shaped brackets 11, each having arms extending on both sides of the wheel and each having a spindle 12 passing therethrough for supporting the corresponding wheel in a generally vertical plane, although these wheels are preferably inclined upwardly and inwardly.

The three brackets 11 are shown as arranged substantially equidistant around the record 65 and each is shown as pivotally mounted at its base on a spindle 13 in a stationary part of the machine, each spindle 13 being arranged parallel with a tangent of the record 65 and being located inside of the center of gravity of its bracket and wheel so that this bracket and wheel will have a natural tendency under gravity to swing radially outwardly and thus avoid the necessity of providing additional means, such as springs, for that purpose.

The three brackets 11 are connected to move in unison about their spindles 13 by a linkage which includes a pair of rock levers 14, one of which is pivotally connected at one end to one of the brackets 11 and the other of which is pivotally connected to another of the brackets 11, and the opposing ends of these rock levers being pivotally connected by a link 15. This connecting link 15 is in turn pivotally connected at its center to one end of a connecting rod 16, the opposite end of which is pivotally connected to the third bracket 11. Each of the rock levers 14 is pivoted intermediate its ends, by means of a vertical spindle 14*a*, to a stationary part of the machine. It will therefore be seen that when the connecting rod 16 is released the wheels 10, 10a are free to swing in unison radially outwardly or away from the center post 1 and that the record 65 supported on these wheels can drop from the playing position shown to rests (not shown) provided in a plane immediately above the connecting rod 16.

Adjacent to its extremities the cam drive shaft 3 carries two hollow cam cylinders 17, 18 which are fast to the cam drive shaft 3 and which are formed to provide cams for actuating the tone arms. For this purpose a portion of the peripheral wall of the cylinder 18 is cut away so as to provide a dwell 18a and cam 18b, this dwell and cam facing toward the center post 1. The cylinder 17 is similarly formed, the dwell being indicated at 17a and the cam being indicated at 17b.

Each of these cams 18b and 17b cooperates with a vertical follower pin 20 mounted at one end of a rock lever 20a, the opposite extremity of each of these rock levers being bifurcated, as indicated at 20b, and each of these rock levers being pivoted on a stationary part to swing about a vertical axis by means of a pivot pin 20c. Each tone arm 8, 9 is supported on a pair of brackets 21 and 22, the tone arm being pivotally secured to the corresponding bracket 21 by means of a horizontal pivot pin 23 and the bracket 22 being suitably secured to a stationary part of the machine. Only portions of the outer casings of the tone arms 8, 9 are shown, these tone arms being free to rock in vertical planes about their supporting pins 23 so that they can follow vertical undulations of the record 65 being played and also so that these tone arms can be moved vertically relative to the record 65 to engage and disengage its stylus (not shown) therewith. This vertical movement of each tone arm is accomplished through a vertically disposed sliding rod 25, each of these rods sliding vertically in a sleeve 26, this sleeve being rotatably supported in the corresponding bracket 22 and being provided with an end head 26a which holds the rotatable sleeve against downward displacement. This head 26a is also fixed to the bracket 21.

Each vertical rod 25 passes through a plate 24a which forms a part of the tone arm casing 24 and has a nut 27 threaded onto its upper end, this nut having a rounding under surface engaging the upper surface of the plate 24a. It will be seen that downward movement of the sliding rod 25, through the medium of the plate 24a, depresses the rear end of the corresponding tone arm casing 24, thereby to elevate the forward end of this tone arm, the tone arm swinging about the pivot pin 23.

To the lower end of each of the vertically sliding rods 25 is fixed a disk 28 and above this disk and immediately under the corresponding bracket 22 the sleeve 26 is provided with an arm 29 fixed thereto and carrying a depending pin 30. Each of these pins is embraced by the bifurcated part 20b of the corresponding rock lever 20a. Accordingly, swinging movement of each rock lever 20a about its pivot pin 20c causes the corresponding sleeve 26 to rotate. It will be noted that the arm 29 prevents upward movement of its sleeve. Since the upper end head 26a of each sleeve 26 is secured to the corresponding tone arm supporting bracket 21, rotation of this sleeve effects swinging movement of its tone arm.

Referring to the cam cylinder 18, the outer end head of this cylinder is provided with a radially outwardly projecting edge 18d having a recess 18e cut therein. This recess and edge are engaged by a follower pin 31b at one end of a rock arm 31, this rock arm being pivoted to a stationary part of the machine, by means of a horizontal pivot pin 31a. The extremity of the rock arm 31 opposite from the follower pin 31b engages the upper side of the disk 28 fast to the lower end of the corresponding vertically sliding rod 25, as previously described. Accordingly, when the cylinder 18 is rotated and the follower pin 31 is disposed on the raised edge 18d, the disk 28 is depressed and the tone arm 9 raised from the record, but when the follower pin 31b drops into the recess 18e, the tone arm 9 can drop onto the record 65 for playing the same, the weight of the free end of this tone arm raising the disk 28.

These conditions are reversed when considered in connection with the other cam cylinder 17 which actuates the tone arm 8 playing the underside of the record 65. In this case the raised surface on the cam cylinder 17 comprises only a short length 17e and for the remainder of the time the follower pin 31b engages with the plain peripheral surface of the cam 17. This follower is connected to actuate, through the rock arm 31, the disk 28 associated with the tone arm 8 and when the operative end of the tone arm 8 drops downwardly out of engagement with the record 65 it raises the disk 28 and holds the follower pin 31b in engagement with the plain peripheral surface of the cam cylinder 17. When the raised portion 17e engages the follower pin 31b, the rock arm 31 is moved to depress the disk 28 associated with the tone arm 8 and the operative end of this tone arm is raised into contact with the under side of the record 65 for playing the same.

In order that the records may be played on both sides without inverting them, it is necessary that the direction of rotation of the record on the wheels 10, 10a be reversed, and for this purpose a reversible motor (not shown) is preferably provided. This reversible motor can be of any type, such as a motor having two armatures upon a single shaft, one armature being used for the drive in one direction and the other when reversal is required. To effect such reversal, a reversing switch 36 is provided so that when actuated in one direction one armature will be energized and when actuated in the other direction the other armature will be energized, these armatures being either wound so as to rotate the motor shaft in opposite directions or alternately being placed the opposite way upon the common shaft.

The reversing switch 36 shown in the drawings is of the ordinary double-pole push-button type. It is actuated by a bifurcated rocking plate 36 fast to a rock shaft 33 which shaft is actuated by one of two strikers 34, 35, adjacent its extremities. These strikers are thrown in opposite directions by pins 37 rotating with the cam cylinders 17, 18 and projecting axially outwardly from the end face of the corresponding cam cylinder.

In order to insure that the two striker pins 37, which travel in opposite directions with the respective cam cylinders 17, 18, do not attempt to actuate both strikers 34, 35 at the same time, it is necessary to provide some means for removing the striker not required from the path of its pin 37. To attain this, the rock shaft 33 is moved axially in its bearings (not shown) by rock arms 38, 39 which are pivoted intermediate their ends on a stationary part of the apparatus and which are actuated by axially extending cam faces 40, 41 of disks 42, 43 which are secured to the corresponding cam cylinders 18, 17 by pins 42b, only the pin on the cam cylinder 18 being shown. Thus, when the rock shaft 33 is moved axially to the left, as shown in the drawings, its striker 34 will be moved laterally toward the end face of the cam cylinder 18 into the path of its pin 37 while the striker 35 at the opposite end of the rock shaft 33 is moved laterally away from the end face of the cam cylinder 17 and out of the path of its striker pin.

In order to release the connecting rod 16 for longitudinal movement, a stop finger 44 is secured thereon and adapted to engage with the end of a rock lever 45 carried by a rock shaft 46 which is suitably journalled in a stationary part of the machine. This rock shaft 46 has a second lever 47 fast thereto at its other end. This rock lever 47 carries a follower pin 47*a* adapted to engage with the rim of the disk 42 and permit the connecting rod 16 to move when the pin 47*a* falls into a peripheral recess 42*a* provided in the disk 42. When the connecting rod is so released for movement, the wheels 10, 10*a* are free to fall outwardly and withdraw support from the record 65 supported thereon. When the disk 42 rotates so as to bring the recess 42*a* out of register with the follower pin 47*a* this follower pin is moved by the disk to swing the rock levers 45 and 47 to actuate the stop finger 44 and connecting rod 16 so as to restore the wheels 10, 10*a* to the position shown for receiving the next record.

Any one of the wheels 10, 10*a* may be driven. In the form of the invention shown the bracket 11 for the wheel 10*a* is shown as provided with a second bracket 11*a* which provides a bearing for the drive spindle 48*a* of a driving wheel 48, the latter always being in driving engagement with the wheel 10*a* whatever the position of the same may be. A flexible drive shaft (not shown) directly connected to the reversible motor (not shown) is preferably provided so that the drive may be obtained through various angles of deflection of the spindle 48*a*.

Since only one tone arm is in operation at a given time means are provided on each reversal in rotation of the cam drive shaft 3 for disconnecting the cam mechanism associated with one tone arm from this cam drive shaft and for simultaneously coupling the cam mechanism associated with the other tone arm to this cam drive shaft. To this end ratchet wheels 49, 50 are fast to opposite ends of the cam drive shaft 3 and pawl devices 51, 52 are provided in association with the cam cylinders 17, 18, respectively. In addition, friction clutch members 53, 54 are provided for engaging and disengaging the pawl devices 52, 51, respectively, with their respective ratchet wheels. Each friction clutch member comprises a light metal arm having an enlarged opening through which the cam drive shaft 3 extends, this opening being of sufficient size to permit a limited displacement of the friction clutch member relative to the drive shart. These friction clutch members 54, 53 are lightly urged into engagement with the corresponding faces of the ratchet wheels 49, 50 by means of springs 57, 58, respectively, and each carries a laterally extending pin 55, 56 engaging, by means of a small slot, as shown, with the free end of the corresponding one of the pawl members 51, 52. The friction clutch member 54 and its pawl device 51 are pivotally mounted intermediate their ends on a pin 59 projecting outwardly from the inner end face of the cam cylinder 17 parallel with the axis of the cam drive shaft 3. Similarly, the friction clutch member 53 and pawl device 52 are pivotally mounted intermediate their ends on a pin 60 projecting outwardly from the inner end face of the cam cylinder 18 parallel with the axis of the cam drive shaft 3. The ratchet wheels 49, 50 are secured in reversed positions on the drive shaft 3, that is, their teeth are inclined in opposite directions.

By reason of the frictional engagement between each friction clutch member 53, 54, with the companion ratchet wheel, a torque is applied to the friction clutch member to swing it about the corresponding pivot pin 60, 59. This swinging movement, through the corresponding pin 55, 56, swings the corresponding pawl device 51, 52 to effect engagement or disengagement between this pawl device and the teeth of the companion ratchet wheel. When the cam drive shaft 3 is rotating in the direction of the arrow associated with the cam cylinder 17 the torque applied to the friction clutch member 54 by the ratchet wheel 49 swings the friction clutch member 54 and pawl device 51 counterclockwise, as viewed in Fig. 1, about the pivot 59 to effect engagement of the operative end of the pawl device 51 with the teeth of the ratchet wheel 49. At the same time the torque applied to the friction clutch member 53 by the ratchet wheel 50 also swings the friction clutch member 53 and pawl device 52 counterclockwise as viewed in Fig. 1, about the pivot 60 to effect disengagement of the pawl device 52 with the teeth of the ratchet wheel 50. Conversely, when the cam drive shaft 3 is rotated in the direction of the arrow associated with the cam cylinder 18, the friction clutch member 54 and pawl device 51 are swung clockwise, as viewed in Fig. 1, about the pivot 59, to disengage the pawl device 51 from the ratchet wheel 49, and the friction clutch member 53 and pawl device 52 are also swung clockwise, as viewed in Fig. 1, about the pivot 60 to engage the pawl device 52 with the ratchet wheel 50. Accordingly it will be seen that when the cam drive shaft 3 rotates in the direction of the arrow associated with the cam cylinder 17, this cam cylinder is rotated in the same direction to operate the tone arm 8, while the opposite cam cylinder 18 and its tone arm 9 remain stationary. Conversely, when the cam drive shaft 3 rotates in the direction of the arrow associated with the cam cylinder 18, this cam cylinder is rotated in the same direction to operate the tone arm 9 while the opposite cam cylinder 17 and its tone arm 8 remain stationary.

The mechanical finger 2 is moved to push the lowermost record from the stack of records supported on the shoulder 1*a* in proper sequence. For this purpose the mechanical finger or pusher 2 is mounted on a vertical arm which is pivoted at its center, as indicated at 2*a*, to swing about a horizontal axis. The lower end of the supporting arm for the pusher 2 is connected by a link with one end of a rock lever 61 which is pivoted at its center, as indicated at 61*a*, to a stationary part of the machine, to swing about a vertical axis. The opposite end of the rock lever 61 carries a depending follower pin 61*b* which is in the path of an axially facing cam 62 provided on the periphery of the cam cylinder 17.

Means are provided for discontinuing the rotation of the operative cam cylinder 17 or 18 during the playing of the record. For this purpose a trip lever 63 is pivoted, as indicated at 63*a*, to a stationary part of the machine to swing about a vertical axis, and the free end of this trip lever carries a downturned finger or trip 63*b* which is normally arranged in the path of the outer end of the pawl device 51. This trip lever 63 also has a horizontal lateral extension 63c which in turn is provided with a downwardly hooked end 63d adapted to be engaged by that end of the rock lever 20a which carries the follower pin 20. A trip lever 64, similar to the rock lever 63, is pivoted, as indicated at 64a, to a stationary part of the machine and to swing about a vertical axis, and the free end of this trip lever carries a downwardly turned finger or trip 64b which is normally arranged in the path of the outer end of the pawl device 52. As with the trip lever 63, this trip lever 64 is provided with a horizontal lateral extension 64c having a downturned end 64d which is adapted to be engaged by that end of the corresponding lever 20a which carries the follower pin 20.

Assuming that a stack of records to be played has been placed upon the upper end of the center post 1, with the lowermost record supported on the shoulder 1a, and assuming that the reversible drive motor (not shown) is energized by the reversing switch 36 to rotate the cam drive shaft 3 in the direction of the arrow associated with the cam cylinder 17 and to rotate the drive roller 48 and the wheel 10a in a direction for playing a record deposited on the wheels 10, 10a on its under side, the operation of the record changer will be as follows:

The first operation involves shifting the lowermost record supported on the shoulder 1a laterally off this shoulder so that this record slides down the center post 1 onto the three wheels 10, 10a. This displacement of the lowermost record is effected by the axially facing cam 62 on the periphery of the cam cylinder 17. This cam during this initial movement of the apparatus moves the follower pin 61b to the right, as shown in Fig. 1, this swinging the rock lever 61, pivoted at 61a, so as to swing the finger or pusher 2 about its horizontal pivot 2a and move its upper end inwardly. This upper end of the pusher or finger 2 is in line with the lowermost record of the stack of records supported on the shoulder 1a and accordingly its inward movement displaces this lowermost record from the shoulder 1a so that the record is free to slide down the post 1 onto the rubber tires of the wheels 10, 10a which, under the assumed condition, are rotating in a direction to play this record from its under side.

The continued movement of the cam cylinder 17 brings the laterally projecting guide surface or finger 17f against the depending follower pin 20 on the rock lever 20a. This engagement causes the follower pin 20 to be moved laterally by the guide surface 17f into the cut away alongside the dwell portion 17a of the cam cylinder 17 and against the inner face of the inner end wall of the cam cylinder 17. This movement of the follower pin 20 causes the bifurcated end 20b of its lever 20a to swing the pin 30 and thereby rotate the sleeve 26 and the tone arm 8. This swings the tone arm 8 under the record 65 now supported on the wheels 10, 10a and swings its stylus (not shown) into vertical alinement with the outer groove of this record. It will therefore be seen that the inner face of the inner end wall of the cylinder 17 indexes the stylus of the tone arm 8 to playing position.

Immediately following this, the follower pin 31b associated with the operative cam cylinder 17 is brought into engagement with the radially projecting cam 17e on this cam cylinder. This raises the follower pin 31b thereby to depress the opposite end of the rock lever carrying this follower pin. The depressing of this opposite end of this lever depresses the corresponding disk 28 which is fast to the sliding rod 25. The upper end of this sliding rod carries the nut 27 which engages the cross plate 24a in the rear end of the casing 24 of the tone arm 8 and hence the rear end of this tone arm is depressed, the tone arm swinging about the pivot 23. This raises the operative end of this tone arm and brings its stylus (not shown) into engagement with the outer groove on the under side of the record 65. Accordingly, playing of the underside of the record 65 is commenced.

During the playing of this underside of the record by the tone arm 8, the cam cylinder 17 is at rest. Stopping the rotation of the cam cylinder 17 is accomplished by the trip lever 63, the depending trip finger 63b of which is in its normal position in the path of the outer end of the pawl device 51. After the radially projecting cam 17e has moved the stylus of the tone arm 8 into engagement with the record 65, the outer end of the pawl device 51 strikes the trip finger 63b. Accordingly, this pawl device is swung about its pivot pin 59 so as to release its operative end from engagement with the teeth of the ratchet wheel 49. Accordingly, the driving relation between the cam drive shaft 3 and the cam cylinder 17 is broken so that this cam cylinder 17 remains stationary during the playing of the underside of the record 65 supported upon the wheels 10, 10a.

During the playing the tone arm 8 has its stylus (not shown) held upwardly in engagement with the groove on the under side of the record 56 and accordingly this tone arm is swung inwardly in following this groove and in reproducing the transcription on the under side of the record. It will be noted that during the playing of the record the follower pin 20 is moved toward the dwell 17a. As the tone arm 8 is swung into the runoff track at the inner end of the groove on the under side of the record 65, the sleeve 26, and crank pin 30 carried thereby, move the bifurcated end of the rock lever 20a so as to swing this rock lever about its pivot 20c and so as to move its other end into engagement with the depending end 63d of the lateral extension 63c of the trip lever 63. This shifts the trip lever 63 to the left as viewed in Fig. 1, and withdraws the depending trip finger 63b from engagement with the outer end of the pawl device 51, and thereby permits this pawl device to swing about its pivot 59 and reengage the teeth of the ratchet wheel 49. This re-establishes driving relation between the cam drive shaft 3 and the cam cylinder 17 so as to restore rotation of this cam cylinder in the direction of the arrow associated with this cam cylinder.

With the movement of the cam cylinder 17 so restored, the radially projecting cam 17e passes beyond the follower pin 31b and thereby permits this follower pin to drop back onto the plain peripheral surface of the cam cylinder 17. This downward movement of the follower pin 31b permits the opposite end of its rock arm 31 to rise, thereby permitting the disk 28 to also rise. This rising of this disk 28 is effected by the preponderating weight of the outer end of the tone arm 8 which is connected to this disk 28 by the sliding rod 25 and nut 27, and it will therefore be seen that so permitting the disk 28 to rise permits the operative end of the tone arm to drop and its stylus (not shown) to fall away from the groove in the underside of the record 65.

As the cam cylinder 17 continues its rotation the operative surface 17b of the cut away portion of this cam cylinder engages the follower pin 20 and swings the corresponding end of the rock lever 20a to the right, as viewed in Fig. 1. This swings this rock lever about the pivot 20c and swings its bifurcated end 20b so as to swing the crank pin 30 to the left, as viewed in Fig. 1. Since this crank pin is connected with the sleeve 26 which carries the tone arm 8, this movement of this crank pin swings the tone arm 8 out from under the record 65 supported by the wheels 10, 10a. During the last part of the movement of the end of the rock lever 20a carrying the depending follower pin 20, this rock lever engages the trip lever 63 and shifts it to the right, as viewed in Fig. 1, and thereby returns it to its normal position wherein its trip finger 63b is in the path of the outer end of the pawl device 51.

Following the restoration of the trip lever 63 to its normal position, the axially facing cam 41 engages the upper end of the lever 39 and moves this end laterally outwardly, thereby to move the lower end of this lever 39 inwardly against the rock shaft 33. In this manner the rock shaft 33 is moved to the right, as viewed in Fig. 1, to bring arm 35 into the path of the striker pin 37 on the cam cylinder 17. This axial shifting of the rock shaft 33 also moves the striker arm 34 out of the path of the striker pin 37 on the cam cylinder 17.

Upon further rotation of the cam cylinder 17 its axially projecting pin 37 engages the lever 35, thereby to rotate the rock shaft 33 in a corresponding direction. This rotation of the rock shaft 33 swings the bifurcated bracket 32 so as to actuate the corresponding push button of the reversing switch 36. This actuation of the reversing switch 36 reverses the energization of the drive motor (not shown) so that the cam drive shaft 3 is driven in the opposite direction and so that the direction of the rotation of the drive wheel 48 is likewise reversed. This latter reverses the rotation of the three wheels 10, 10a so that the record 65 upon these wheels is now rotated in the proper direction for playing its upper side. With this reversal in rotation of the cam drive shaft 3, the torque applied to the friction clutch member 54 by the ratchet wheel 49 swings the friction clutch member 54 and pawl device 51 counterclockwise, as viewed in Fig. 1, about the pivot 59 to disengage the pawl device 51 from the ratchet wheel 49 and thereby break the driving connection between the cam drive shaft 3 and the cam cylinder 17. At the same time, the torque applied to the friction clutch member 53 by the ratchet wheel 50 swings the friction clutch member 53 and pawl device 52 clockwise, as viewed in Fig. 1, about the pivot 60, to engage the pawl device 52 with the ratchet wheel 50 and establish a driving connection between the cam drive shaft 3 and the cam cylinder 18.

The same sequence of operations is now performed by the cam 18, as previously described with reference to the cam 17, with the exception that there is no mechanism required for actuating the record push off finger 2, since this record push off finger is only operated after every alternate playing. An additional function of the cam cylinder 18, however, is the rejection of a record after playing, this being performed by the recessed portion 42a on the disk 42 which rotates with the cam cylinder 18. When this recessed portion 42a comes into register with the follower pin 47a, this follower pin is permitted to move inwardly toward the axis of rotation of the cam cylinder 18, thus permitting its rock lever 47 to move inwardly. This permits the rock shaft 46 and rock lever 48 to move in a corresponding direction and releases the finger 44 from restraint by the free end of the rock lever 45. Releasing the finger 44 frees the connecting rod 16 and its associated linkage 14, 15 so that the wheels 10, 10a are permitted to swing outwardly, their brackets 11 having a preponderating weight outside of their pivot 13 for this purpose. As the wheels 10, 10a so swing outwardly the record 65 drops from these wheels onto supports (not shown) and as the recess 42a in the disk 42 passes beyond the follower pin 47a this follower pin 47 is forced outwardly thereby to restore the levers 47, 45 and rock shaft 46 to the original position assumed, this movement of the lever 45 forcing the finger 44 in the direction for moving the connecting rod 16 to restore the wheels 10, 10a to the operative position shown.

In order to remove rejected records it is necessary to open the wheels 10, 10a again and this may be accomplished by starting the machine and permitting it to run until the rock lever 45 releases the connecting rod 16, the operator then stopping the mechanism. A cam can also be provided on this connecting rod 16 which, when partially rotated, will lift up the pile of played records so that they can be removed by hand, the cam being actuated by a lever and connecting links secured to the frame of the machine, the cam being returned to inoperative position by spring means. Such mechanism has merely been described for the sake of convenience and forms no part of the automatic means operating the machine and hence is not shown herein.

I claim:

1. In a disk record player, the combination of a plurality of generally vertical disk-like wheels adapted to support and rotate a record in a non-vertical plane, a rotatable member arranged to engage the periphery of at least one of said wheels and rotate it about its axis to rotate said record, and means actuated in timed relation to the playing of a record and arranged to move said wheels in a generally horizontal direction toward and from the axis of rotation of said record to disengage said record from said wheels.

2. In a disk record player, the combination of an escapement supporting a stack of generally horizontal records and adapted to release the lowermost record of the stack and permit it to fall by gravity, means synchronized with the playing of a record for actuating said escapement, a plurality of generally vertical disk-like wheels arranged below said stack of records and adapted to support and rotate said released record in a non-vertical plane, means for rotating at least one of said wheels about its axis to rotate said record, means synchronized with said escapement for moving at least one of said wheels toward the axis of rotation of the record to cause the released record to be caught by said wheels, at least one tone arm for playing the record supported by said wheels, and means for subsequently moving at least one of said wheels in a generally horizontal direction away from the axis of rotation of said supported record to permit said record to fall by gravity from said wheels.

3. In a disk record player, the combination of a plurality of generally vertical disk-like wheels adapted to support and rotate a record in a non-vertical plane, means supporting said wheels with their axes directed toward the axis of rotation of the record and for movement in a generally horizontal direction radially toward and from the axis of rotation of said record, a rotatable member arranged to engage the periphery of at least one of said wheels, a tone arm for playing the record supported by said wheels, and means for moving said wheels in unison radially outwardly in said generally horizontal direction from the axis of rotation of said record to permit said record to fall by gravity from said wheels.

4. In a disk record player, the combination of an escapement supporting a stack of generally horizontal records and adapted to release the lowermost record of the stack and permit it to fall, means synchronized with the playing of a record for actuating said escapement, a plurality of generally vertical disk-like wheels arranged below said stack of records and adapted to support and rotate said released record in a non-vertical plane, means for rotating at least one of said wheels about its axis to rotate said record, means arranged directly below each of said wheels and pivotally supporting each of said wheels in a generally vertical position with its axis directed toward the axis of rotation of said released record and to swing about an axis arranged generally parallel with an adjacent tangent of said record, means synchronized with said escapement for swinging said wheels in unison about said axes parallel with said tangents toward said axis of rotation of said released record to cause the released record to be caught by said wheels, at least one tone arm for playing the record supported by said wheels, and means for subsequently swinging said wheels in unison about said axes parallel with said tangents and away from said axis of rotation of said released record to permit said record to fall from said wheels.

5. In a disk record player, the combination of a plurality of generally vertical disk-like wheels adapted to support and rotate a record in a non-vertical plane, a bracket having a generally vertical arm, means pivotally supporting each of said wheels on the upper end of a corresponding one of said arms with its axis directed toward the axis of rotation of said record, means pivotally supporting the base of each of said brackets to swing about a generally horizontal axis generally perpendicular to the axis of its wheel, means rotating at least one of said wheels to rotate said record, a tone arm for playing the record supported by said wheels, and means for swinging said brackets in unison about their axes in a generally horizontal direction away from the axis of rotation of said record to permit said record to fall from said wheels.

GILBERT SLATER.

REFERENCES CITED

The following references are of record in the file of this patent:

UNITED STATES PATENTS

| Number | Name | Date |
|---|---|---|
| 1,547,768 | Little | July 28, 1925 |
| 2,068,449 | Downs | Jan. 19, 1937 |

FOREIGN PATENTS

| Number | Country | Date |
|---|---|---|
| 377,173 | Great Britain | 1932 |
| 598,583 | Germany | May 24, 1934 |
| 541,156 | Great Britain | Nov. 14, 1941 |